(12) United States Patent
Schmoeller et al.

(10) Patent No.: US 9,138,067 B2
(45) Date of Patent: Sep. 22, 2015

(54) METHODS AND APPARATUSES FOR COMFORT/SUPPORT ANALYSIS OF A SLEEP SUPPORT MEMBER

(75) Inventors: Joe W. Schmoeller, Chapel HIll, NC (US); David B. Scott, Carthage, MO (US); Robert D. Oexman, Carthage, MO (US); Joshua Carrier, Joplin, MO (US)

(73) Assignee: KINGSDOWN, INC., Mebane, NC (US)

( * ) Notice: Subject to any disclaimer, the term of this patent is extended or adjusted under 35 U.S.C. 154(b) by 238 days.

(21) Appl. No.: 12/920,307

(22) PCT Filed: Nov. 14, 2008

(86) PCT No.: PCT/US2008/083602
§ 371 (c)(1),
(2), (4) Date: Aug. 30, 2010

(87) PCT Pub. No.: WO2009/157965
PCT Pub. Date: Dec. 30, 2009

(65) Prior Publication Data
US 2011/0041592 A1    Feb. 24, 2011

Related U.S. Application Data

(60) Provisional application No. 61/075,796, filed on Jun. 26, 2008.

(51) Int. Cl.
*A47C 31/12*   (2006.01)
*G01M 99/00*   (2011.01)

(52) U.S. Cl.
CPC ........... *A47C 31/123* (2013.01); *G01M 99/001* (2013.01)

(58) Field of Classification Search
USPC .......................... 73/11.04, 788, 806
See application file for complete search history.

(56) References Cited

U.S. PATENT DOCUMENTS

| 1,703,587 A | 2/1929 | Kraft |
| 3,462,778 A | 8/1969 | Whitney |

(Continued)

FOREIGN PATENT DOCUMENTS

| GB | 2373189 A | 9/2002 |
| JP | 2005-062165 A | 3/2005 |

(Continued)

OTHER PUBLICATIONS

Diffrient, Niels et al., Humanscale 1/2/3, 1974, The MIT Press, Cambridge.

(Continued)

*Primary Examiner* — Paul West
(74) *Attorney, Agent, or Firm* — Sughrue Mion, PLLC

(57) ABSTRACT

A method of testing a sleep support member, the method including: identifying the sleep support member; determining a tested comfort/support value for the identified sleep support member before the identified sleep support member is provided to a customer; and determining whether the tested comfort/support value is within a predetermined tolerance level of a goal comfort/support value for the identified sleep support member. An apparatus for testing a sleep support member, the apparatus including: an identification unit configured to identify the sleep support member; a comfort/support testing unit configured to determine a tested comfort/support value for the identified sleep support member before the identified sleep support member is provided to a customer; and an analysis unit configured to determine whether the tested comfort/support value is within a predetermined tolerance level of a goal comfort/support value for the identified sleep support member.

44 Claims, 2 Drawing Sheets

(56) References Cited

U.S. PATENT DOCUMENTS

| | | |
|---|---|---|
| 3,657,921 A | 4/1972 | Lang |
| 3,786,676 A | 1/1974 | Korolyshun et al. |
| 4,331,026 A | 5/1982 | Howard et al. |
| 4,501,034 A | 2/1985 | Greenawalt |
| 4,982,466 A | 1/1991 | Higgins et al. |
| 5,062,169 A | 11/1991 | Kennedy et al. |
| 5,105,488 A | 4/1992 | Hutchinson et al. |
| 5,148,706 A | 9/1992 | Masuda et al. |
| 5,150,608 A | 9/1992 | Mazzoleni et al. |
| 5,231,717 A | 8/1993 | Scott et al. |
| 5,533,459 A | 7/1996 | Fontana |
| 5,848,450 A | 12/1998 | Oexman et al. |
| 5,987,675 A | 11/1999 | Kim |
| 6,212,718 B1 | 4/2001 | Stolpmann et al. |
| 6,220,088 B1 | 4/2001 | Scales et al. |
| 6,269,505 B1 | 8/2001 | Wilkinson |
| 6,317,912 B1 | 11/2001 | Graebe et al. |
| 6,327,725 B1 | 12/2001 | Veilleux et al. |
| 6,468,234 B1 | 10/2002 | Van der Loos et al. |
| 6,523,812 B1 | 2/2003 | Spinks et al. |
| 6,560,803 B2 | 5/2003 | Zur |
| 6,571,192 B1 | 5/2003 | Hinshaw et al. |
| 6,585,328 B1 | 7/2003 | Oexman et al. |
| 6,662,393 B2 | 12/2003 | Boyd |
| 6,687,935 B2 | 2/2004 | Reeder et al. |
| 6,741,950 B2 | 5/2004 | Hinshaw et al. |
| 6,786,083 B1 * | 9/2004 | Bain et al. ............................ 73/78 |
| 6,813,791 B2 | 11/2004 | Mossbeck et al. |
| 6,862,763 B2 | 3/2005 | Mossbeck et al. |
| 6,878,121 B2 | 4/2005 | Krausman et al. |
| 6,916,236 B2 | 7/2005 | Terpstra |
| 6,983,503 B2 | 1/2006 | Ahn |
| 6,986,182 B2 | 1/2006 | Mossbeck |
| 6,990,425 B2 | 1/2006 | Hinshaw et al. |
| 7,127,759 B2 | 10/2006 | Koops |
| 7,325,267 B2 | 2/2008 | Slettaoyen |
| 7,386,903 B2 | 6/2008 | Hochschild |
| 7,725,967 B2 | 6/2010 | Simmerer et al. |
| RE41,809 E | 10/2010 | Hinshaw et al. |
| 2002/0178503 A1 | 12/2002 | Reeder et al. |
| 2003/0125899 A1 | 7/2003 | Hinshaw et al. |
| 2004/0139549 A1 | 7/2004 | Mohrekesh et al. |
| 2004/0177449 A1 | 9/2004 | Wong et al. |
| 2004/0215416 A1 | 10/2004 | Hinshaw et al. |
| 2005/0035862 A1 * | 2/2005 | Wildman et al. .......... 340/573.1 |
| 2005/0115003 A1 * | 6/2005 | Torbet et al. ...................... 5/727 |
| 2005/0166326 A1 | 8/2005 | Chaffee |
| 2006/0112489 A1 | 6/2006 | Bobey et al. |
| 2006/0143831 A1 | 7/2006 | Wu |
| 2006/0179573 A1 | 8/2006 | Nissen et al. |
| 2006/0236460 A1 | 10/2006 | Hooper |
| 2007/0021965 A1 | 1/2007 | Boyd |
| 2007/0033788 A1 * | 2/2007 | Chitty et al. ............. 29/243.521 |
| 2007/0056112 A1 | 3/2007 | Graebe |
| 2007/0061974 A1 | 3/2007 | Gabbay |
| 2007/0061976 A1 | 3/2007 | Bazargani |
| 2007/0086947 A1 | 4/2007 | Boyd |
| 2007/0199154 A1 | 8/2007 | Escaross |
| 2007/0238935 A1 | 10/2007 | Boyd |
| 2008/0093784 A1 | 4/2008 | Rawls-Meehan |
| 2008/0201856 A1 | 8/2008 | Howard |
| 2008/0244831 A1 | 10/2008 | Kenmochi |
| 2009/0006027 A1 | 1/2009 | Hinshaw |
| 2009/0240514 A1 | 9/2009 | Oexman et al. |
| 2010/0313359 A1 | 12/2010 | Scott et al. |
| 2010/0317930 A1 | 12/2010 | Oexman et al. |
| 2010/0318239 A1 | 12/2010 | Oexman et al. |
| 2011/0010014 A1 | 1/2011 | Oexman et al. |
| 2011/0010249 A1 | 1/2011 | Oexman et al. |
| 2011/0163885 A1 | 7/2011 | Poulos et al. |

FOREIGN PATENT DOCUMENTS

| | | |
|---|---|---|
| KR | 10-2005-0013491 A | 2/2005 |
| WO | 97/32509 A1 | 9/1997 |
| WO | 99/63314 A1 | 12/1999 |
| WO | 0051470 A1 | 9/2000 |
| WO | 2005/104904 A1 | 11/2005 |
| WO | 2006/023479 A2 | 3/2006 |
| WO | 2007053150 A1 | 5/2007 |

OTHER PUBLICATIONS

Diffrient, Niels et al., Humanscale 4/5/6, 1981, The MIT Press, Cambridge.
Tilley, Alvin R., The Measure of Man and Woman, 2002, John Wiley & Sons, New York.
Supplementary European Search Report for EP 08874842.1 dated Jan. 26, 2012.
Russian Office Action for RU 2010144181 dated Mar. 6, 2012 and English-language translation thereof.
Jacobson et al., "Subjective Rating of Perceived Back Pain, Stiffness and Sleep Quality Following Introduction of Medium-Firm Bedding Systems," Journal of Chiropractic Medicine, vol. 5, No. 4, pp. 128-134, National University of Health Sciences, Winter 2006.
Iber et al., "The AASM Manual for the Scoring of Sleep and Associated Events: Rules, Terminology and Technical Specifications," 2007, American Academy of Sleep Medicine (AASM), 2007, Westchester, IL.
Dement, William C., "History of Sleep Physiology and Medicine," Principles of Sleep Medicine, Page Fourth Edition, p. 1, 2005.
Extended European Search Report issued Sep. 9, 2011, for European Application 08872440.6.
Extended European Search Report issued Sep. 12, 2011 for European Application 08872303.6.
Russian Official Action (Inquiry) dated Jun. 8, 2011, for Russian Application 2010135586.
Singapore Office Action (Written Opinion issued by Hungarian Intellectual Property Office) dated Feb. 2, 2012, for Singapore Application 201005897-2.
International Search Report dated Apr. 10, 2012, for PCT/US2011/050122.
Chinese Office Action dated Feb. 12, 2014, for Chinese application 20088130080.5.
Singapore Office Action (Invitation to Respond to Written Opinion) issued by Hungarian Intellectual Property Office on May 7, 2014, for Singapore Application 201009110-6.
Korean Office Action dated Dec. 24, 2014, for Korean Application 10-2010-7025986.
Singapore Office Action (Examination Report by Hungarian Intellectual Property Office) mailed Feb. 12, 2015, for Singapore Application 201009110-6.
Canadian Office Action mailed Mar. 19, 2015, for Canadian Application 2,724,593.

* cited by examiner

METHODS AND APPARATUSES FOR COMFORT/SUPPORT ANALYSIS OF A SLEEP SUPPORT MEMBER

CROSS-REFERENCE TO RELATED PATENT APPLICATION

This application claims priority from U.S. Provisional Patent Application No. 61/075,796, filed on Jun. 26, 2008, in the U.S. Patent and Trademark Office, the disclosure of which is incorporated herein by reference in its entirety.

BACKGROUND

1. Technical Field

Methods and apparatuses consistent with the present invention relate to comfort/support analysis of a sleep support member and to determining whether the firmness of an identified sleep support member is acceptable. Among other things, methods and apparatuses consistent with the present invention relate to testing a sleep support member's firmness after the sleep support member is manufactured, but before the sleep support member leaves the manufacturing line. These methods and apparatuses also relate to determining whether customized sleep support members, which have been custom-manufactured to provide optimal support and comfort characteristics for a particular person(s), have been manufactured to desired specifications.

2. Description of the Related Art

A wide variety of different sleep systems are currently available. Such sleep systems may comprise all aspects of a bedding assembly including, but not limited to, mattresses, box springs, foundation units, bed frames, pillows, mattress pads, linens and, more generally, to any type of sleep product that influences a person's sleep. However, each respective sleep system may be suitable for some persons but not suitable for others persons.

It is particularly important for a mattress and/or a foundation unit to provide proper comfort and support for a person using the mattress and/or foundation unit. For example, a mattress may deliver support through the resistance provided by innersprings to the downward force applied due to the person's body weight.

However, conventional manufacturing methods cannot guarantee that a manufactured mattress will provide comfort and support characteristics for a purchaser within acceptable tolerances. Further, there is no way for a purchaser to know that a mattress that is delivered to the purchaser's home exhibits the same comfort and support characteristics as the mattress that the purchaser tested in the store. Thus, there is a need for an objective way for a consumer to determine whether a purchased mattress is acceptable.

Whether or not a mattress will provide proper comfort and/or support for an individual person can be determined by subjecting the mattress to a firmness test. This can be accomplished by using, for example, an Indention/Load/Deflection ("ILD") test machine. An ILD test machine is a conventional device that tests the firmness of a mattress or a foundation unit by determining how far the surface of the mattress or foundation unit deflects when subjected to a certain force (i.e., load). Conventional ILD test machines take measurements at regular intervals (e.g., ¼ inch or one inch).

Although such conventional ILD test machines are sometimes used to approximate the firmness of a batch of mattresses or foundation units by testing one mattress or foundation unit from the batch at the design stage, there is no conventional system that allows testing of whether the firmness of each and every mattress or foundation unit that is produced in a manufacturing line is acceptable as each mattress or foundation unit is manufactured. Thus, there is a need for an in-manufacturing-line comfort/support analysis system. Such a system would (among other advantages) help to address the problem of ensuring that a customized mattress and/or foundation unit (i.e., a mattress and/or foundation unit that is custom manufactured to meet the specific characteristics of the intended user(s)) is suitable for use by the user(s). There is also a need for an improved comfort/support analysis system for research and development purposes.

Conventional ILD test machines have failed to address these problems and the prior art has failed to appreciate the aforementioned advantages. Indeed, conventional ILD test machines have not been employed in a manufacturing line for testing mattresses, much less for every mattress that is manufactured. Moreover, conventional ILD test machines are typically only used to determine a firmness value for a specific deflection and there is generally no comparison performed using the entire ILD curve (i.e., various loads vs. deflection values). However, mattresses and foundation units frequently do not exhibit a linear ILD curve (i.e., they do not behave with a constant force per unit length according to Hooke's Law $F=-k \cdot x$).

Instead, the ILD curve of many mattresses and foundation units is more complex because many mattresses or foundation units are made of multiple components and layers that provide varying levels of firmness. For instance, the top portion of a mattress typically comprises comfort materials such as foam and fiber materials that exhibit a different ILD curve than the support layers comprising inner-springs that are disposed underneath the comfort layers.

Accordingly, an in-manufacturing-line comfort/support analysis system would be useful to manufacturers for warranty and quality assurance purposes and would allow manufacturers to ensure that manufacturing methods are correct. For example, an in-manufacturing-line comfort/support analysis system would allow manufacturers to guarantee that every manufactured mattress will provide comfort and support characteristics for a purchaser within acceptable tolerances. Such an in-manufacturing-line comfort/support analysis system would also provide customers with an objective way to distinguish mattresses.

Additionally, a comfort/support analysis system that employs a comfort/support analysis curve, instead of a single point of measurement, would provide a more accurate assessment of the sleep support member's characteristics. Moreover, measuring the comfort/support analysis curve while removing the testing platen from the mattress, in addition to measuring the comfort/support analysis curve while the testing platen is deflecting into the mattress, would allow analysis of the sleep support member's material recovery characteristics.

SUMMARY

Methods and apparatuses are described for comfort/support analysis of a sleep support member. An aspect of the present invention provides a method of testing a sleep support member, the method comprising: identifying the sleep support member; determining a tested comfort/support value for the identified sleep support member before the identified sleep support member is provided to a customer; and determining whether the tested comfort/support value is within a predetermined tolerance level of a goal comfort/support value for the identified sleep support member.

Another aspect of the present invention provides an apparatus for testing a sleep support member, the apparatus comprising: an identification unit configured to identify the sleep support member; a comfort/support testing unit configured to determine a tested comfort/support value for the identified sleep support member before the identified sleep support member is provided to a customer; and an analysis unit configured to determine whether the tested comfort/support value is within a predetermined tolerance level of a goal comfort/support value for the identified sleep support member.

Another aspect of the present invention provides a method of testing a sleep support member, the method comprising: identifying the sleep support member; determining a tested comfort/support value for the identified sleep support member; and determining whether the tested comfort/support value is within a predetermined tolerance level of a goal comfort/support value for the identified sleep support member; wherein the goal comfort/support value comprises at least one goal Indention/Load/Deflection ("ILD") curve.

BRIEF DESCRIPTION OF THE DRAWINGS

The above and other aspects will become more apparent by describing in detail illustrative embodiments thereof with reference to the attached drawings in which.

DETAILED DESCRIPTION OF ILLUSTRATIVE EMBODIMENTS

Hereinafter, illustrative embodiments of the present invention will be described in detail with reference to the attached drawings.

Figure 1:
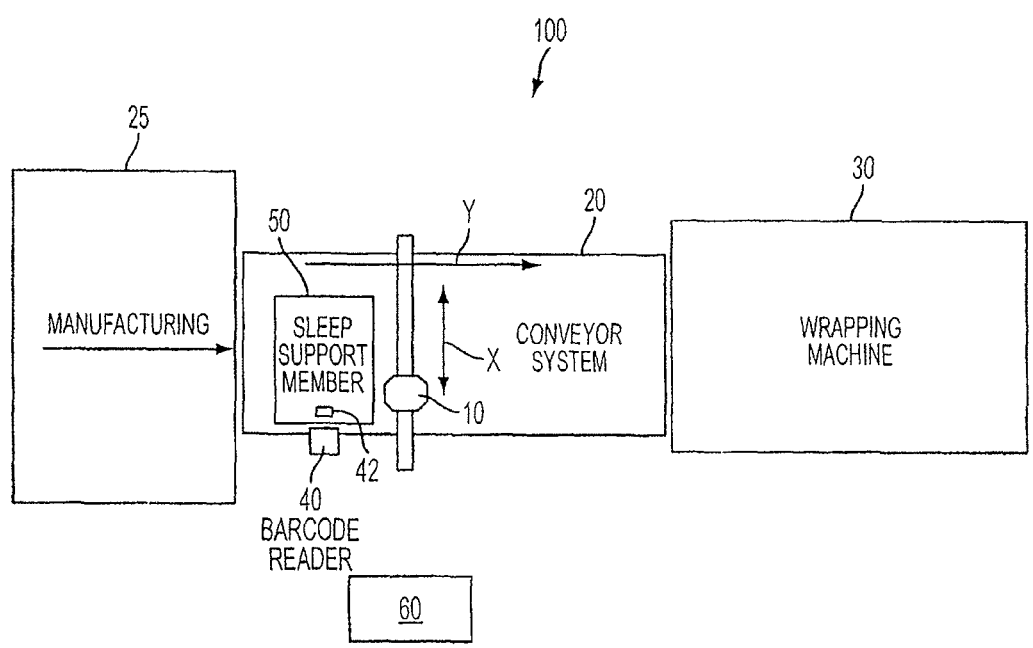
FIG. 1 is a schematic view of a comfort/support analysis system for a sleep support member according to an illustrative embodiment of the present invention.

FIG. 1 shows a sleep support member manufacturing line 100 according to an illustrative embodiment of the present invention. The illustrative sleep support member manufacturing line 100 includes a manufacturing area 25 for manufacturing a sleep support member 50. The sleep support member 50 may comprise a wide variety of sleep system components including, but not limited to, a mattress and/or foundation unit.

According to the illustrative embodiment shown in FIG. 1, each manufactured sleep support member 50 is brought to a conveyor system 20 that conveys the sleep support member 50 from the manufacturing area 25 to a wrapping machine 30 that prepares the sleep support member 50 for shipment by wrapping the sleep support member 50.

While the sleep support member 50 is on the conveyor system 20, the identity of the sleep support member 50 is determined by a reader 40 based on an identifier 42 provided on or in the sleep support member 50. The identifier 42 can include, but is not limited to, a bar code or a Radio Frequency Identification Device (RFID) tag, while the reader 40 can include, but is not limited to, for example, a bar code reader or an RFID reader. However, the invention is not limited in the aforementioned illustrative configurations and other identifiers/readers can be used consistent with the present invention.

According to an illustrative embodiment, the identifier 42 can include a wide variety of information relating to the sleep support member 50 including, but not limited to, goal specifications, goal comfort/support analysis curves, goal tolerance levels, sleep support member type, identifiers regarding the plant in which the sleep support member was manufactured, date of manufacture, information regarding manufacturing materials, customer information, etc. According to one illustrative embodiment, the identifier 42 comprises reference information relating to a database, data file, or the like, wherein the database data file, or the like stores goal specifications, goal comfort/support analysis curves, goal tolerance levels, sleep support member type, identifiers regarding the plant in which the sleep support member was manufactured, date of manufacture, information regarding manufacturing materials, customer information, etc.

The firmness of the sleep support member 50 can be tested by a comfort/support analysis system 10. However, the invention is not limited in this respect. The comfort/support analysis system 10 can be disposed in a manufacturing line, or can be used outside of a manufacturing line for research and development purposes. The comfort/support analysis system 10 can include a contact surface that applies a load to the sleep support member 50 at a specific location and a strain gauge that measures the deflection of the sleep support member 50, but the invention is not limited to these structures. As the load applied to the sleep support member 50 at the specific location is increased, the sleep support member 50 will deflect a larger amount.

According to an illustrative embodiment, the contact surface is pressed a specified distance into the sleep support member 50 at a specific location and the corresponding force applied to the sleep support member 50 is analyzed. For example, measurements of corresponding forces taken within a distance from the top surface of the sleep support member 50 to a depth of approximately two inches from the surface of the sleep support member 50 could provide an approximation of the typical thickness of comfort materials in a mattress and could be used to calculate a comfort score. Further, measurements of corresponding forces taken within a distance from a depth of two inches from the surface of the sleep support member 50 to a depth of approximately seven inches from the surface of the sleep support member 50 could provide an approximation of the typical thickness of support materials in a mattress and could be used to calculate a support score. However, the present invention is not limited to the aforementioned illustrative embodiment and a wide variety of different measurement depths can be employed to calculate a comfort score and a support score since the thickness of comfort materials and support materials in a mattress can vary and the aforementioned embodiment only employs general approximations of these materials. Moreover, according to one illustrative embodiment, measurements of corresponding forces taken at a top portion of the sleep support member 50 can provide an approximation of the typical thickness of comfort materials in a mattress and could be used to calculate a comfort score, and measurements of corresponding forces taken at a bottom portion of the sleep support member 50 could be used to calculate a support score.

According to another illustrative embodiment, the contact surface is pressed into the sleep support member 50 at a specific location until a specified force applied to the sleep support member 50 is measured and the corresponding distance that the contact surface is pressed into the sleep support member 50 is measured. The aforementioned specified force may, for instance, correlate to anthropometric data to measurements acquired for a specific person.

According to an illustrative embodiment, the reader 40 reads the identifier 42 of the sleep support member 50 to acquire goal specifications comprising goal comfort/support analysis curves, for each sleep support member 50 that has been manufactured. The use of comfort/support analysis curves rather than just a single measurement point provides a more accurate comfort/support analysis of the sleep support member 50. For example, when a very broad shouldered person is sleeping on his/her side, the load on the sleep support member 50 at a specific location will be much greater than when the broad shoulder person is sleeping on his/her back, where the load is spread out to more locations on the sleep support member 50. By using goal comfort/support analysis curves rather than single goal ILD point, a sleep support member 50 can be tested to ensure (among other things) that it has the appropriate firmness for each sleeping position.

In addition, according to an illustrative embodiment of the present invention, the comfort/support analysis system 10 includes a contact surface that applies a load to the sleep support member 50 at a specific location and that measures the comfort/support analysis curve while removing the contact surface from the sleep support member 50. In such a manner, the material recovery characteristics of the sleep support member 50 can be analyzed.

Once the goal specifications for the manufactured sleep support member 50 are acquired, the comfort/support analysis system 10 then measures a comfort/support analysis curve at one or more locations on the identified sleep support member 50 by proceeding through a programmed test for the identified sleep support member 50. The testing is controlled, for example, by a controller 60, which includes a processor and a memory. Consistent with the present invention, it is possible for the comfort/support analysis system 10 to comprise multiple testing units, for example, to test both sides of a custom-manufactured sleep support member, wherein each side of the custom-manufactured sleep support member exhibits different characteristics.

If more than one location is to be used, then the comfort/support analysis system 10 is moved in the X and/or Y-directions, as shown in FIG. 1, from one appropriate location over the identified sleep support member 50 to the next appropriate location over the identified sleep support member 50. At each location, the load applied to the sleep support member 50 is gradually increased, while the comfort/support analysis system 10 determines the amount that the sleep support member 50 deflects. The measured comfort/support analysis curve is determined based on the respective deflection values for each of the different loads.

In contrast to conventional ILD machines, which provide a weighted average ILD measurement, embodiments of the present invention provide both a comfort analysis measurement and a support analysis measurement. Indeed, one drawback (among other drawbacks) with using a conventional weighted average ILD measurement is that two sleep support members can have the same ILD weighted average, but have vastly different comfort/support characteristics (i.e., the two mattresses have completely different "feels").

According to an illustrative embodiment, a plurality of analysis locations are used to replicate the physical attributes of the intended user(s) of the sleep support member 50. For example, a plurality of pressing structures may be arranged so that the location of each pressing structure replicates a part of the intended user's (or users') body (or bodies) depressed downwardly into the sleep support member 50 as described by the inventors of the present application, for example, in U.S. Pat. No. 6,585,328, entitled "Customized Mattress Evaluation System" and in U.S. Provisional Application 61/028,599 entitled "Method and Apparatus for Testing a Mattress," both of which are incorporated herein by reference in their entirety. Such a plurality of pressing structures can be employed, for instance, to measure comfort/support analysis curves relating to the amount that the sleep support member 50 deflects at a plurality of different locations deflected by each of the pressing structures, respectively. Additionally, such a plurality of pressing structures can be employed to deflect the sleep support member 50 at a number of locations until a certain force is reached and then the resulting deflection of the sleep support member 50 when the certain force is reached can be evaluated.

Indeed, consistent with an illustrative embodiment of the present invention, a person could first be evaluated using the systems and methods described in U.S. Provisional Application 61/028,578, entitled "Apparatus and Methods for Evaluating a Person for a Sleep System," which is incorporated herein by reference in its entirety, so as to determine optimal support and comfort characteristics for the person. Then, a customized mattress could be manufactured for the person which exhibits the determined optimal support and comfort characteristics. Finally, illustrative embodiments of the present invention could be employed to evaluate whether the customized mattress accurately conforms to the determined optimal support and comfort characteristics within predetermined tolerance levels. For example, measurements relating to the consumer's body can be acquired in a sleep support member store using the systems and methods described in U.S. Provisional Application 61/028,578, and then such measurements can be transferred to the plurality of pressing structures arranged to replicate a part of the intended user's (or users') body (or bodies) depressed downwardly into the sleep support member 50 as described in U.S. Pat. No. 6,585,328.

The determinations provided by the comfort/support analysis system 10 are then compared with the goal comfort/support analysis curves. The identified sleep support member 50 is assigned a pass/fail value depending on whether the determined comfort/support analysis curves deviate from the goal curves by more than a predetermined tolerance level (e.g., ±2%, ±10%, ±20%, etc.). According to an illustrative embodiment, the predetermined tolerance level is smaller for a highly customized sleep support member (i.e., a sleep support member designed precisely according to the user's specific physical attributes) than for a generically customized sleep support member (i.e., a sleep member generically designed for a plurality of users with similar physical attributes). In this way, the purchaser of a highly customized sleep support member can be assured that the mattress and/or box spring meets his/her precise specifications.

According to an illustrative embodiment, each and every sleep support member 50 that is manufactured using a particular manufacturing line is subjected to testing by the comfort/support analysis system 10 to ensure that each sleep support member 50 meets desired specifications.

In one embodiment, a sleep support member 50 that is assigned a fail value for goal comfort/support analysis curves of a specific product is discarded. However, in another embodiment, if a tested sleep support member 50 is assigned a fail value for goal comfort/support analysis curves of a specific product, then the measured comfort/support analysis curves of the tested sleep support member 50 are compared with the goal comfort/support analysis curves of various other products that are stored in a database within memory of the controller 60 or in an external database. If the measured comfort/support analysis curves of the tested sleep support member 50 match the goal comfort/support analysis curves of another product, within a required predetermined tolerance level, then the tested sleep support member 50 is re-assigned as the other product for which the tested sleep support member 50 exhibits a pass value and, thus, discarding of the mattress is avoided.

Thereafter, the sleep support member 50 is sent to the wrapping machine 30 in order to prepare the sleep support member 50 for shipping, such as to the customer or a local store. A print out showing the actual measured comfort/support analysis curves compared to the goal comfort/support analysis curves can be included with the product to provide the customer assurance that the delivered sleep support member meets specifications.

Figure 2:
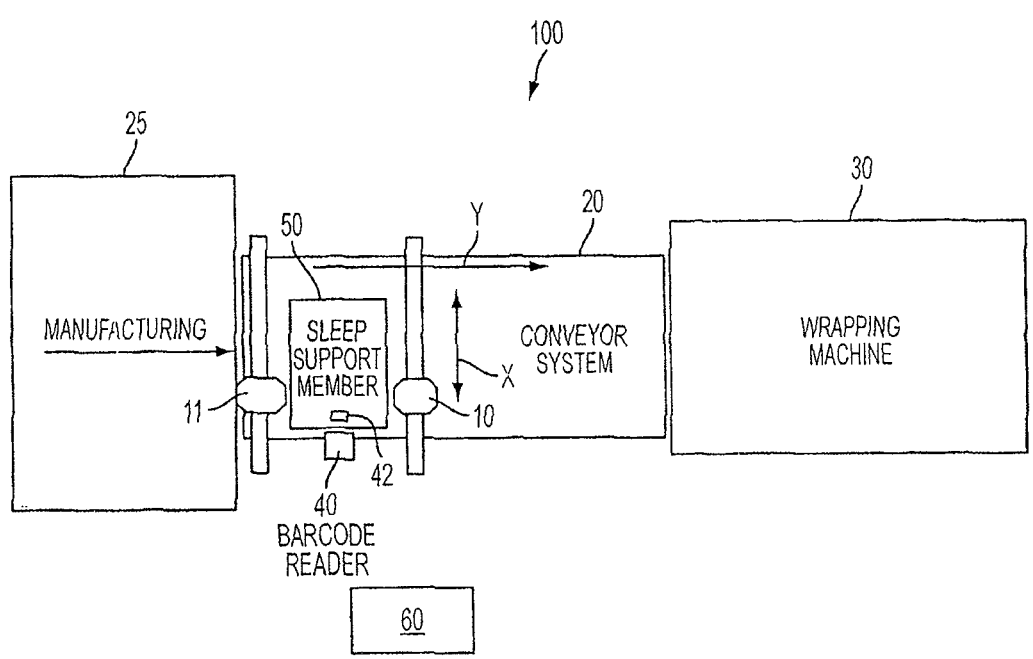
FIG. 2 is a schematic view of a first comfort/support analysis system and a second comfort/support analysis system configured to test two opposing sides of a sleep support member according to an illustrative embodiment of the present invention.

According to an illustrative embodiment shown in FIG. 2, a second comfort/support analysis system 11 may also be employed to test the firmness of the sleep support member 50. For example, the comfort/support analysis system 10 may be configured to test one side of the sleep support member 50 and the second comfort/support analysis system 11 may be configured to test an opposite side of the sleep support member 50. According to the illustrative configuration shown in FIG. 2, for example, two opposing sides of the sleep support member 50 can be tested at the same time and the physical attributes of two intended users of the sleep support member 50 (e.g., two sleeping partners) can be replicated.

While the present invention has been particularly shown and described with reference to illustrative embodiments thereof, it will be understood by those of ordinary skill in the art that various changes in form and details may be made therein without departing from the spirit and scope of the invention as defined by the appended claims. The illustrative embodiments should be considered in a descriptive sense only and not for purposes of limitation. Therefore, the scope of the invention is defined not by the detailed description of the invention but by the claims set forth in the related non-provisional application and all differences within the scope will be construed as being included in the present invention.

What is claimed is:

1. A method of testing a sleep support member, the method comprising:
    identifying the sleep support member;
    determining a tested comfort/support analysis curve for the identified sleep support member while the identified sleep support member is in a manufacturing line; and
    determining whether a range of values along the tested comfort/support analysis curve deviates from a goal comfort/support analysis curve for the identified sleep support member by more than a predetermined tolerance level.

2. The method of claim 1, wherein the sleep support member comprises at least one of a mattress and a box spring.

3. The method of claim 1, wherein the goal comfort/support analysis curve comprises a goal Indention/Load/Deflection ("ILD") curve, and
    wherein the tested comfort/support analysis curve is determined by an ILD test.

4. The method of claim 3, further comprising:
    determining a plurality of tested comfort/support analysis curves for the identified sleep support member while the identified sleep support member is in the manufacturing line; and
    determining, for each of the plurality of tested comfort/support analysis curves, whether a range of values along the respective tested comfort/support analysis curve deviates from a respective goal comfort/support analysis curve by more than a respective predetermined tolerance level.

5. The method of claim 4, wherein each of the plurality of tested comfort/support analysis curves comprises an ILD curve.

6. The method of claim 4, wherein each of the plurality of tested comfort/support analysis curves for the identified sleep support member is associated with a different location on the sleep support member.

7. The method of claim 4, wherein a first of the plurality of tested comfort/support analysis curves for the identified sleep support member is associated with a location on a first side of the sleep support member; and
    wherein a second of the plurality of tested comfort/support analysis curves for the identified sleep support member is associated with a location on a second side of the sleep support member, opposite to said first side.

8. The method of claim 7, wherein the first of the plurality of tested comfort/support analysis curves and the second of the plurality of tested comfort/support analysis curves are determined simultaneously.

9. The method of claim 1, wherein the goal comfort/support analysis curve is retrieved from a memory.

10. The method of claim 9, wherein the memory includes a plurality of other goal comfort/support analysis curves respectively associated with a plurality of other sleep support members, and
    wherein the method further comprises, in response to determining that the range of values along the tested comfort/support analysis curve deviates from the goal comfort/support analysis curve for the identified sleep support member by more than the predetermined tolerance level, then searching the plurality of other goal comfort/support analysis curves to determine if the range of values along the tested comfort/support analysis curve deviates from one of the plurality of other goal comfort/support analysis curves by more than the predetermined tolerance level.

11. The method of claim 1, wherein the identifying the sleep support member comprises reading a bar code provided on the sleep support member.

12. The method of claim 1, wherein the identifying the sleep support member comprises reading an RFID provided on or in the sleep support member.

13. The method of claim 1, wherein the determining a tested comfort/support analysis curve for the identified sleep support member comprises:
    applying a load to the sleep support member at a location using a contact surface; and
    measuring a deflection of the sleep support member caused by the applied load.

14. The method of claim 13, further comprising:
    applying a plurality of loads to the sleep support member at the location using the contact surface; and
    measuring a plurality of corresponding deflections of the sleep support member caused by the applied loads.

15. The method of claim 1, further comprising determining recovery characteristics of the sleep support member.

16. The method of claim 15, wherein the determining recovery characteristics of the sleep support member comprises:
    applying a load to the sleep support member at a location using a contact surface; and
    measuring a plurality of deflections of the sleep support member caused by the applied load as the applied load is removed from the sleep support member.

17. The method of claim 1, further comprising communicating the tested comfort/support analysis curve to a consumer.

18. The method of claim 1, wherein the method is performed for substantially all sleep support members that are manufactured in the manufacturing line.

19. The method of claim 1, wherein the determining the tested comfort/support analysis curve for the identified sleep support member comprises determining the tested comfort/support analysis curve for the identified sleep support member before the identified sleep support member is provided to any customers.

20. The method of claim 1, wherein the determining a tested comfort/support analysis curve for the identified sleep support member is performed only while the identified sleep support member is in the manufacturing line.

21. The method of claim 1, further comprising determining whether the range of values along the tested comfort/support analysis curve deviates from the goal comfort/support analysis curve for the identified sleep support member by more than a predetermined percentage.

22. An apparatus for testing a sleep support member, the apparatus comprising:
    an identification unit configured to identify the sleep support member;
    a comfort/support testing unit configured to determine a tested comfort/support analysis curve for the identified sleep support member while the identified sleep support member is in the manufacturing line; and
    an analysis unit configured to determine whether a range of values along the tested comfort/support analysis curve deviates from a goal comfort/support analysis curve for the identified sleep support member by more than a predetermined tolerance level.

23. The apparatus of claim 22, wherein the sleep support member comprises at least one of a mattress and a box spring.

24. The apparatus of claim 22, wherein the goal comfort/support analysis curve comprises at least one goal Indention/Load/Deflection ("ILD") curve, and
    wherein the tested comfort/support analysis curve is determined by an ILD test.

25. The apparatus of claim 24, wherein the comfort/support testing unit is configured to determine a plurality of tested comfort/support analysis curves for the identified sleep support member while the identified sleep support member is in the manufacturing line; and
    wherein the analysis unit is configured to determine, for each of the plurality of tested comfort/support analysis curves, whether a range of values along the respective tested comfort/support analysis curve deviates from a respective goal comfort/support analysis curve by more than a respective predetermined tolerance level.

26. The apparatus of claim 25, wherein each of the plurality of tested comfort/support analysis curves comprises an ILD curve.

27. The apparatus of claim 25, wherein the comfort/support testing unit is configured such that each of the plurality of tested comfort/support analysis curves for the identified sleep support member is associated with a different location on the sleep support member.

28. The apparatus of claim 25, wherein the comfort/support testing unit is configured such that a first of the plurality of tested comfort/support analysis curves for the identified sleep support member is associated with a location on a first side of the sleep support member; and
    wherein the comfort/support testing unit is configured such that a second of the plurality of tested comfort/support analysis curves for the identified sleep support member is associated with a location on a second side of the sleep support member, opposite to said first side.

29. The apparatus of claim 28, wherein the comfort/support testing unit is configured to determine the first of the plurality of tested comfort/support analysis curves and the second of the plurality of tested comfort/support analysis curves simultaneously.

30. The apparatus of claim 22, further comprising a memory;
    wherein the goal comfort/support analysis curve is retrieved from the memory.

31. The apparatus of claim 30, wherein the memory includes a plurality of other goal comfort/support analysis curves respectively associated with a plurality of other sleep support members, and
    wherein the analysis unit is configured to, in response to determining that the range of values along the tested comfort/support analysis curve deviates from the goal comfort/support analysis curve for the identified sleep support member by more than the predetermined tolerance level, then search the plurality of other goal comfort/support analysis curves to determine if the range of values along the tested comfort/support analysis curve deviates from one of the plurality of other goal comfort/support analysis curves by more than the predetermined tolerance level.

32. The apparatus of claim 22, wherein the identification unit is configured to identify the sleep support member using a bar code provided on the sleep support member.

33. The apparatus of claim 22, wherein the identification unit is configured to identify the sleep support member using an RFID provided on or in the sleep support member.

34. The apparatus of claim 22, wherein the sleep support member comprises an identifier; and
    wherein the identifier comprises information relating to at least one of goal specifications of the sleep support member, goal ILD curves of the sleep support member, goal tolerance levels of the sleep support member, a type of the sleep support member, a location where the sleep support member was manufactured, a date of manufacture of the sleep support member, manufacturing materials of the sleep support member, and customer information.

35. The apparatus of claim 34, wherein the identifier comprises reference information relating to a database.

36. The apparatus of claim 22, wherein the comfort/support testing unit comprises:
    a contact surface configured to apply a load to the sleep support member at a testing location; and
    a measurement unit configured to measure a deflection of the sleep support member caused by the applied load at the testing location.

37. The apparatus of claim 36, wherein the contact surface is configured to apply a plurality of loads to the sleep support member at the testing location; and
    wherein the measurement unit is configured to measure a plurality of corresponding deflections of the sleep support member caused by respective applied loads.

38. The apparatus of claim 22, wherein the comfort/support testing unit is configured to determine recovery characteristics of the sleep support member.

39. The apparatus of claim 38, wherein the comfort/support testing unit comprises:
    a contact surface configured to apply a load to the sleep support member at a testing location; and
    a recovery characteristics measurement unit configured to measure a plurality of deflections of the sleep support member caused by the applied load as the applied load is removed from the sleep support member.

40. The apparatus of claim 22, further comprising a communication unit configured to communicate the tested comfort/support analysis curve to a consumer.

41. The apparatus of claim 22, wherein the identification unit is configured to identify substantially all sleep support members that are manufactured in a manufacturing line;
- wherein the comfort/support testing unit is configured to determine a tested comfort/support analysis curve for each of the identified sleep support members while the identified sleep support members are in a manufacturing line; and
- wherein the analysis unit is configured to determine whether a range of values along each of the tested comfort/support analysis curves deviates from a respective goal comfort/support analysis curve for each of the respective identified sleep support members by more than the predetermined tolerance level.

42. A method of testing a sleep support member, the method comprising:
- identifying the sleep support member;
- determining a tested comfort/support analysis curve for the identified sleep support member while the identified sleep support member is in the manufacturing line; and
- determining whether a range of values along the tested comfort/support analysis curve deviates from a goal comfort/support analysis curve for the identified sleep support member by more than a predetermined tolerance level;
- wherein the goal comfort/support analysis curve comprises a goal Indention/Load/Deflection ("ILD") curve.

43. The method of claim 42, further comprising:
- determining a plurality of tested comfort/support analysis curves for the identified sleep support member while the identified sleep support member is in the manufacturing line; and
- determining, for each of the plurality of tested comfort/support analysis curves, whether a range of values along the respective tested comfort/support analysis curve deviates from a respective goal comfort/support analysis curve by more than a respective predetermined tolerance level.

44. The method of claim 42, further comprising determining recovery characteristics of the sleep support member.

* * * * *